Sept. 8, 1964  W. SCHÖNBORN ETAL  3,148,278
TEMPERATURE COMPENSATED GAUGING APPARATUS
Filed March 14, 1960
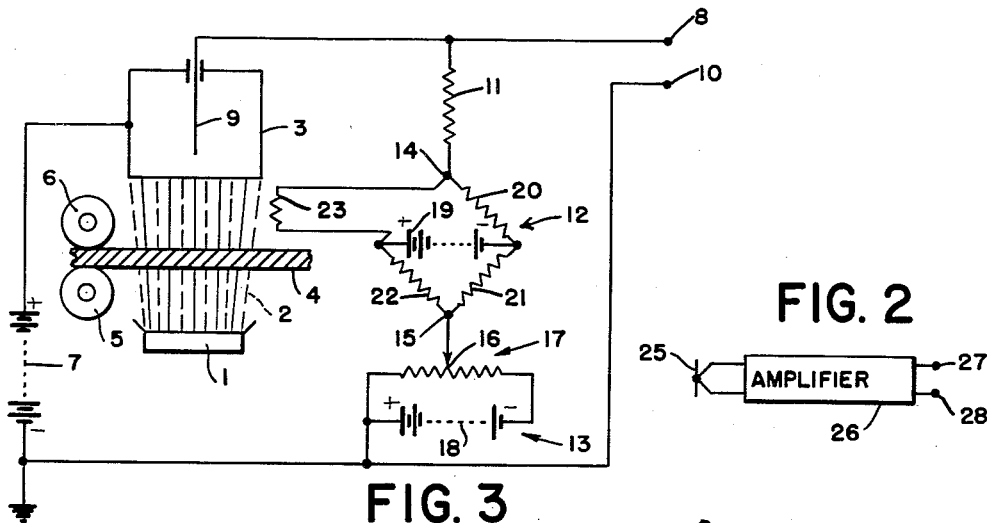
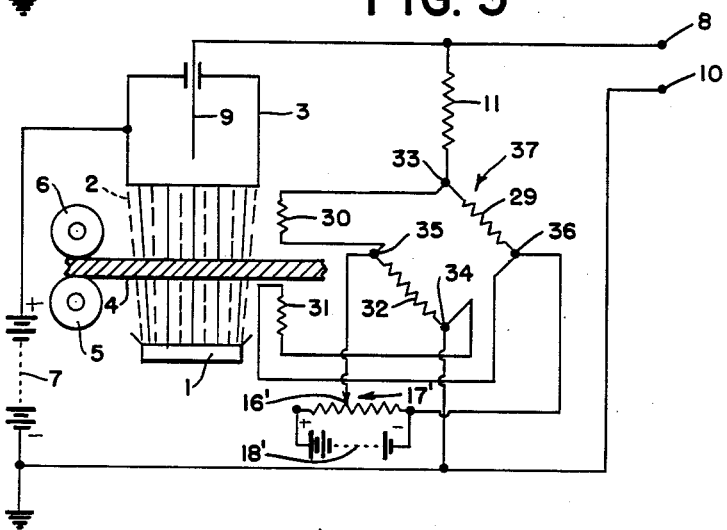
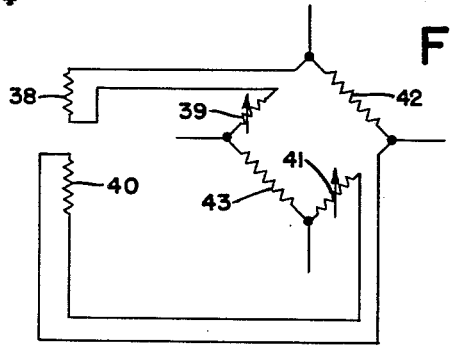
INVENTORS:
WOLFGANG SCHÖNBORN
GÜNTER DÖRFEL

United States Patent Office

3,148,278
Patented Sept. 8, 1964

3,148,278
TEMPERATURE COMPENSATED GAUGING APPARATUS
Wolfgang Schönborn and Günter Dörfel, Dresden, Germany, assignors to VEB Vakutronik, Dresden, Germany
Filed Mar. 14, 1960, Ser. No. 14,876
13 Claims. (Cl. 250—83.3)

This invention relates to temperature compensated gauging apparatus for gauging weight per unit of length of materials or for gauging the thickness as a function of length of materials such as sheet materials or thread-shaped materials. More particularly, the present invention relates to such gauging apparatus in which an object to be measured passes through a radiation path, preferably through a radioactive radiation path.

In these apparatus use is made of the fact that radiation is absorbed to a certain extent by a material which passes through the path of said radiation. The amount of absorption is a function of thickness of the material and also a function of the weight per unit of length, if the material passes with a given speed through said radiation path. Comparison of the radiation without any absorption, on the one hand, with the smaller amount of radiation measured after absorption, on the other hand, gives a precise measure of the thickness of objects to be gauged.

One disadvantage of these devices is that the measured values are temperature dependent.

There are devices known in which it has been tried to provide temperature compensating means in order to achieve the required precision of measurement in spite of temperature influences. One compensation method is the so called ray compensation while the other method is an electrical compensation.

In devices using one or the other compensation method the object to be measured is exposed to the radiation, for instance, of a radio isotope by passing said object through the radiation path. A radiation receiver is arranged opposite of the radiation emitting surfaces. This receiver converts the part of the radiation not absorbed into an equivalent electrical value, preferably a current which is proportional to said radiation. As outlined above it is possible to determine from the intensity of current or the amount of absorption the dimensions of the objects to be measured.

In devices which work with ray compensation the output current of the radiation receiver is not directly fed into an indicator. For compensation purposes this current is compared with the output current of a second radiation receiver. The latter receives a radiation which is either emitted by a radiation source which irradiates the object to be measured or which is derived from a second radiation source. In the second radiation path is an absorber made of the same material as the object to be measured and which already has the dimensions which the object to be measured shall have.

Devices which work with electrical compensation are provided with a load resistor having a high impedance through which the measuring current flows. Consequently the measuring current causes a voltage drop across said high resistive load resistor. This voltage drop is compared with a second adjustable and highly constant voltage. This highly constant voltage is equal to the voltage drop caused by the object to be measured, if this object has the correct dimensions.

The highly constant voltage will be called hereafter the standard reference or rated voltage while the voltage drop caused by the object to be measured will be called the actual voltage.

In case the rated voltage corresponds to the actual voltage it is merely required to provide electronic circuits which function as a null-amplifier following the radiation receiver. Consequently the amplifier must not comply with high requirements.

These known devices have certain drawbacks. If, for instance, Beta-Rays, which are strongly absorbed even by objects with small weights per area unit, are used for measuring thickness, considerable faulty measurements can be caused by the fact that the air between the radiation emitter and the receiver changes its temperature. The influence of the air is due to the fact that the absorption of radiation in the air must be added to the absorption in the object to be measured. These measuring faults are particularly significant if small weights per area unit are to be measured.

It is therefore one of the major objects of the present invention to provide means for compensation of temperature effects which cause faulty measuring results in devices for measuring the thickness of materials as a function of area unit by means of measuring radiation not absorbed by said material, and thereby deriving from the amount of absorption the thickness of the material.

It is a further object of the present invention to provide temperature compensating means which compensate for temperature changes in the radiation path through which the object to be measured passes.

Another object of the present invention is to provide means which also compensate for temperature characteristic of the devices and means involved in the entire measuring process.

It is a further object of this invention to provide temperature compensation in such a manner that said rated voltage value is a function of temperature changes and a function of the voltage value of the object to be measured.

Another object of this invention is to provide temperature compensation in such a manner that a temperature compensating voltage is a function of temperature changes and of the rated voltage value of the object to be measured.

It is a further object of this invention to provide particularly temperature compensating means for devices which work with electrical compensation as outlined above.

The errors due to changes of air temperature in the radiation paths do not occur in devices which work with ray compensation, *if* the air temperatures in the radiation paths used for measuring and for comparison are subject to the same temperature changes, and *if* the distances between radiation emitter and receiver are equal for the measuring unit and for the comparison unit. It is, however, very hard to comply with the above requirements for all practical purposes.

Furthermore it is undesirable to provide two radiation sources and two receivers since this requires more complicated devices to provide radiation protection for the persons operating the device. It furthermore makes the construction of such apparatus complex and expensive.

It is therefore another object of the present invention to provide temperature compensation for gauging apparatus in a very economical way.

Devices which work with electrical compensation are fully subject to faults due to changes in air temperature if no special precautions have been taken. It is known, for instance, to make use of devices with electrical compensation, which are preferred over devices with ray compensation for their simplicity of construction and easier protection of operators from radiation.

Said electrical compensation is achieved by using a load resistor having a high impedance for the receiver output current, said load resistor having a negative temperature coefficient. Provided that the temperature in the radiation path and the temperature of the load resistor show similar changes, a compensation is possible, since with increasing temperature in the radiation path— which is also the gauging station—the absorption in said path decreases due to the thinner air. If at the same time the temperature of the air surrounding the load resistor increases at the same rate, the impedance of the load resistor decreases due to its negative temperature coefficient. The voltage drop across the load resistor therefore remains constant.

In practical applications, however, considerable difficulties occur. One difficulty resides in the fact that the large load resistor is usually placed, together with the radiation receiver and if necessary with pre-amplifiers, in a tightly closed, rigid casing, while the radiation source is placed in another casing. It is therefore unlikely that the radiation path and load resistor are subject to the same temperature changes. At least it will take a considerable delay until temperature changes in the radiation path and/or in the load resistor are balanced. Exact results of measurement are therefore only obtainable after a certain period of time. The readiness for immediate operation of such devices is therefore very low.

It is therefore another object of the present invention to provide temperature compensating means which allow immediate use of such devices and to obtain immediately exact measuring results.

Another drawback of known devices is the fact that it is very difficult to obtain a number of load resistors which all have the very same high impedance required. If, for instance, an ionization chamber is used for a radiation receiver, impedances for the load resistors are required in the order of $10^9$ and $10^{11}$ ohms. Such resistors have considerable manufacturing tolerances. It is already hard enough to measure exactly resistors with such high impedance. Consequently, it is also hard to measure the temperature coefficients of these resistors. Experience shows that the characteristics of these resistors fluctuate very much even for resistors which were made in the same batch. It is thus almost impossible to select resistors with suitable characteristics, for instance, negative temperature characteristics, from a large number of resistors manufactured in mass production.

It is therefore another object of the present invention to eliminate the above disadvantages and drawbacks of known devices. It is particularly the object of this invention to provide temperature compensation means for electrically compensated devices which are also useful in cases where the weight of air in the radiation path changes due to temperature changes.

The objects of the invention are basically achieved by providing a standard reference voltage source the output voltage of which is automatically controlled by temperature sensitive means which are energized by temperature changes in the radiation path and which are so dimensioned that they also compensate for temperature characteristics of the other devices involved such as the ionization chamber.

According to the invention the temperature sensitive means provide a correcting voltage which is superimposed on, preferably added to, said standard reference voltage whereby a compensating voltage is achieved which increases or decreases the output voltage according to temperature changes.

The objects of the invention, the invention itself and its advantages will be more clearly understood from the following specification in connection with the accompanying drawings in which, FIG. 1 illustrates a circuit diagram of one embodiment of the invention;

FIG. 2 shows the use of a thermo-element;

FIG. 3 illustrates a circuit diagram of a further embodiment of the invention; and FIG. 4 shows a bridge circuit useful in connection with the invention.

FIGURE 1 illustrates a gauging device according to the invention. The gauging device comprises a radiation emitter 1 which is preferably a radioactive specimen. At 2 there is indicated a radiation path which is directed towards a radiation receiver 3 which, in this embodiment of the invention, is an ionization chamber, known in the art. An object 4 to be measured is pulled through radiation path 2 by means of rollers 5 and 6 or any other known conveying means. A battery 7 supplies the ionization chamber 3 in known manner with a voltage sufficient for operation.

Output terminal 8 is connected to the electrode 9 of the ionization chamber 3 while output terminal 10 is connected to the negative pole of battery 7 and through the battery to the outer wall of chamber 3, said wall forming the second electrode of the ionization chamber.

In parallel to the output terminals 8 and 10, a series circuit is connected which comprises a load resistor 11 and temperature compensating means comprising a bridge circuit 12 and a standard reference voltage source 13. One bridge terminal 14 is connected to said load resistor 11 while the opposite bridge terminal 15 is connected to the tap 16 of potentiometer 17. The latter is connected in parallel to a battery 18 one pole of which is connected to ground and also to output terminal 10.

A battery 19, which supplies the bridge with a suitable voltage, is connected across the other diagonal of bridge 12. Each bridge arm comprises a resistor 20, 21, 22, and 23. Resistor 23 connected to bridge points 14 and 24 has a suitable temperature coefficient and is arranged according to the invention as close to the radiation path 2 as possible. Consequently the difference in time between temperature changes in the radiation path and in the air surrounding the load resistor is eliminated almost entirely.

If a temperature change occurs in the radiation path the temperature sensitive device according to the invention generates immediately a voltage proportional to said change. This voltage is superimposed on the voltage drop across the load resistor and consequently the voltage drop across the load resistor is temperature compensated. The overall voltage across the output terminals 8, 10, which are connected to an amplifier, not shown, is then not influenced any more by any temperature changes in the radiation path 2.

The apparatus operates as follows. The ionization current generated in chamber 3 is a function of the intensity of radiation received by chamber 3. As a result said current causes across load resistor 11 a voltage drop which is also a measure of said radiation and consequently also a measure of the weight per area unit of object 4.

By means of potentiometer 16 a standard reference voltage is selected which is equal to the voltage across load resistor 11 if the actual or measured weight value of object 4 corresponds to a standard reference weight value.

The portion of radiation absorbed by the air above and below the object 4 becomes smaller if, for instance, the temperature surrounding object 4, that is the temperature in the radiation path, rises since the density of the air decreases with rising temperature. As a result the voltage drop across load resistor 11 increases since more radiation is received without any changes in the object to be measured. According to the invention this voltage increase across resistor 11 due to temperature increases in the radiation path is compensated for by means of resistor 23 which is closely arranged to the radiation path.

This resistor 23 has a suitable temperature coefficient and since it is in the same environment with increasing temperature, it changes its impedance. If, for instance, a resistor with a positive temperature coefficient is used the voltage across bridge points 14, 15 increases. The magnitude and polarity of this bridge voltage is adjusted by dimensioning the bridge elements in such a way that the bridge voltage counteracts the portion of the voltage across load resistor 11 caused by said changes of density of air in the radiation path. A complete compensation of the fault voltage is achievable if the resistors and the supply voltage of the bridge are dimensioned suitably.

It is possible according to the invention to use instead of a resistance thermometer as shown in FIG. 1 a thermocouple element as is illustrated in FIG. 2. A thermocouple element 25 is connected to an amplifier 26 with output terminals 27, 28. These terminals 27, 28 are connected into one arm of a suitable bridge circuit. The thermocouple 25 is placed close to the radiation path 2 in the same manner as indicated for resistor 23 in FIG. 1.

With a device as shown in FIG. 1 an exact temperature compensation is achieved in a limited temperature range, since intensity changes due to temperature influence are directly proportional to the actual intensity whereas the basic circuit described above generates only a compensation or correction voltage which is proportional to temperature changes and independent of the actual intensity. If, for instance, temperature influence is compensated while measuring small weights per area unit, this compensation voltage can cause faulty measuring results while measuring large weights per area unit.

It is, however, possible to provide for exact overall compensation by making the compensation voltage generated by the bridge circuit also dependent on the respective position of the potentiometer of the standard reference voltage whereby it is also made dependent on the intensity to be expected. According to the invention this is achieved by means of a special bridge circuit whereby a standard reference voltage is changed automatically as a function of temperature fluctuations. These changes are controlled by special temperature sensitive means. An embodiment containing this feature is shown in FIG. 3.

All elements in FIG. 3, which are also shown in FIG. 1, are designated with the same reference numerals and all elements but the bridge circuit and the standard reference voltage source are interconnected in the same manner as in FIG. 1. In FIG. 3 the bridge circuit comprises resistors 29, 30, 31, and 32. Bridge point 33 is connected to one end of load resistor 11 while bridge point 34 is connected to ground and thereby to output terminal 10. Bridge point 35 is connected to tap 16' of potentiometer 17' one end of which is connected to one terminal of battery 18' while the other end of potentiometer 17' is connected to the other pole of battery 18' and also to bridge point 36. Resistors 30 and 31 have a suitable temperature coefficient and they are arranged as close to the radiation path 2 as possible.

The device illustrated in FIG. 3 works as follows. The standard reference voltage, which is adjusted with potentiometer 17' and which is in opposition to the voltage drop across load resistor 11, is connected over the bridge circuit 37 to one end of load resistor 11 at point 33. The bridge circuit with its resistors 29, 30, 31, and 32 is untuned and made dependent on temperature changes by means of resistors 30 and 31 which have a suitable temperature coefficient. The ratios between resistors 29, 31 and 32, 30 are so chosen that a corresponding portion of the voltage adjusted with potentiometer 17' is impressed across the respective diagonal of the bridge. This voltage portion is fed as a compensation voltage to load resistor 11. This feeding of the standard reference voltage does not impair the basic function of the electrical compensation since the compensation voltage across the bridge between points 33, 34 can be adjusted with the potentiometer 17' if the supply voltage for the bridge between points 35 and 36 is large enough.

In FIG. 3 the compensation voltage across bridge points 33, 34 is proportional to the standard reference voltage adjusted with potentiometer 17'. The voltage reduction due to the bridge circuit is taken into consideration in the overall calibration of the circuit.

It is further achieved with the circuit according to FIG. 3 that the correction voltage which is superimposed on the bridge voltage and which corresponds to temperature changes in the radiation path between radiation source 1 and receiver 3 is directly proportional to the standard reference voltage adjusted with potentiometer 17'.

A further advantage of the circuit shown in FIG. 3 is that no additional voltage source is required for the temperature compensating bridge circuit as shown in FIG. 1. This additional voltage source shown in FIG. 1 can be made mechanically adjustable by controlling the potentiometer 17 for the standard reference voltage in synchronism with a voltage control for said additional voltage.

Due to the proportionalities discussed above, the conditions in the radiation path due to temperature changes are entirely compensated for, provided that the ratios between the resistors of the bridge and the temperature coefficients of resistors 30, 31 are chosen correctly.

It is an advantage of the device according to the invention that it is very economical in initial costs as well as the space, maintenance and radiation protection required.

It depends on the measurements required which or how many bridge arms are to be provided with elements having a suitable temperature coefficient. Preferably two bridge arms are provided with elements having a temperature coefficient.

Elements without a temperature dependency are used for special adaptation of the bridge elements having a temperature coefficient to the radiation source and to the distance prevailing between radiation source and receiver.

In this connection it is advantageous to connect in series with one or more bridge elements an adjustable resistor as shown in FIG. 4 wherein bridge resistor 38 is connected in series with an adjustable resistor 39. Bridge resistor 40 is also connected in series with a potentiometer 41, while resistors 42 and 43 in the two remaining bridge arms do not have an additional series resistor, they, however, can have one if necessary. With this arrangement a precise adjustment is achieved.

The device according to the invention can also be used for actual value indicators wherein the standard reference voltage value is controlled by a regulating motor which continuously readjusts the reference value to the actual value.

It is also possible to place into the bridge circuit, aside from said temperature sensitive means 30, 31, resistors the value of which is proportionally adjustable to the distance between the radiation source and the radiation receiver. With this provision it is then possible to obtain, at least in given temperature and distance ranges, complete compensation of important factors which are rather difficult to control.

It is, of course, to be understood that the present invention is, by no means, limited to the particular arrangements shown in the drawings but also comprises any modification within the scope of the appended claims.

What is claimed is:

1. A temperature compensated gauging apparatus in which an object to be measured passes through a radiation path, said apparatus comprising an emitter for producing penetrative radiation, a receiver in said path for converting said radiation into a direct voltage proportional thereto, a single pair of output terminals for said direct voltage, a load resistor and a temperature compensating circuit series connected across said terminals, said circuit comprising a standard reference direct voltage source and a resistance element disposed close to said path to be influenced by the temperature prevailing in said path and serving to develop a compensating direct voltage as a function of changes of said temperature in the path, said compensating voltage being impressed in backing relationship on said terminals, whereby the output of the gauging apparatus is independent from temperature variations in the radiation path.

2. A temperature compensated gauging apparatus according to claim 1, wherein said temperature compensating circuit includes a bridge having one arm including said resistance element which has a suitable temperature coefficient, said bridge being connected in series with said load resistor and said standard voltage source.

3. A temperature compensated gauging apparatus according to claim 2, wherein said bridge comprises at least in one of its arms a resistor having impedance variable with said temperature changes, said resistor being located closely to said path and to said object.

4. A temperature compensated gauging apparatus according to claim 2, wherein said bridge comprises at least in one of its arms a thermocouple having a suitable temperature coefficient, said thermocouple being located closely to said path between said emitter and said receiver.

5. A temperature compensated gauging apparatus in which an object to be measured passes through a radiation path, said apparatus comprising an emitter for producing penetrative radiation, a receiver in said path for converting received radiation into equivalent direct voltage, said receiver having a single pair of output terminals, a series circuit connected between said terminals and comprising a load resistor and temperature compensating means including a resistor close to said path for providing a compensating direct voltage as a function of temperature changes in said path and a standard reference direct voltage source connected to oppose the voltage drop across said load resistor produced by said voltage of the receiver.

6. A temperature compensated gauging apparatus according to claim 5, wherein said temperature compensating means includes a bridge circuit having a suitable temperature coefficient and having one terminal connected to said load resistor and another terminal connected to one of said output terminals, a potentiometer connected in parallel to said standard voltage source, two remaining terminals of said bridge circuit being connected to the output of said potentiometer.

7. A temperature compensated gauging apparatus according to claim 6, wherein said bridge circuit comprises at least in one of its bridge arms a resistor having a negative temperature coefficient and being located close to said path between said emitter and said receiver.

8. A temperature compensated gauging apparatus according to claim 6, wherein said bridge circuit comprises at least in one of its bridge arms thermoelectric elements having a suitable temperature coefficient and being located closely to said path between said emitter and said receiver.

9. A temperature compensated gauging apparatus according to claim 5, wherein said temperature compensating means has a bridge circuit comprising in at least one of its arms an adjustable resistor connected in series with means having an impedance which is a function of temperature.

10. A temperature compensating circuit for apparatus gauging the physical characteristics of objects by means of penetrative radiation, said apparatus having an emitter producing a radiation path and a receiver in said path for converting radiation unabsorbed by said objects into a proportional output direct voltage, comprising, in combination, a standard reference direct voltage source, a bridge circuit detuned with regard to direct voltages and connected with one diagonal across said voltage source, and at least one temperature dependent circuit element in said bridge and located in said path closely to said objects, the other diagonal of said bridge circuit being connected in parallel to said output voltage, whereby changes of the voltage source are counter-acted by a parallel-connected compensating voltage in dependence of the temperature variation prevailing in said path.

11. A temperature compensating circuit according to claim 10, wherein said bridge circuit element is a thermocouple element having a temperature coefficient adapted to provide said compensating voltage.

12. A temperature compensating circuit according to claim 11, wherein said compensating voltage is additively superposed on said voltage source.

13. A temperature compensating circuit according to claim 12, further comprising at least one variable resistor element in said bridge so as to provide fine adjustment for the balancing of said bridge diagonals.

References Cited in the file of this patent

UNITED STATES PATENTS

| | | |
|---|---|---|
| 2,919,351 | Swift | Dec. 29, 1959 |
| 2,968,727 | Otis | Jan. 17, 1961 |
| 2,968,729 | Pepper et al. | Jan. 17, 1961 |

FOREIGN PATENTS

| | | |
|---|---|---|
| 577,419 | Canada | June 9, 1959 |